US012652209B2

(12) United States Patent
Lnu et al.

(10) Patent No.: US 12,652,209 B2
(45) Date of Patent: Jun. 9, 2026

(54) METHOD AND SYSTEM FOR PRIORITIZING FAULT MANAGEMENT SESSIONS, Y.1731 SESSIONS, AND/OR ASSOCIATED FAULT REPORTING

(71) Applicant: CIENA CORPORATION, Hanover, MD (US)

(72) Inventors: Priyanshu Lnu, Meerut (IN); Ashutosh Aggarwal, Saket (IN)

(73) Assignee: CIENA CORPORATION, Hanover, MD (US)

( * ) Notice: Subject to any disclaimer, the term of this patent is extended or adjusted under 35 U.S.C. 154(b) by 114 days.

(21) Appl. No.: 18/536,425

(22) Filed: Dec. 12, 2023

(65) Prior Publication Data

US 2025/0141731 A1      May 1, 2025

(30) Foreign Application Priority Data

Oct. 30, 2023    (IN) .............................. 202311073873

(51) Int. Cl.
H04L 41/0604      (2022.01)
H04L 41/0631      (2022.01)
(52) U.S. Cl.
CPC ........ H04L 41/0609 (2013.01); H04L 41/065 (2013.01)
(58) Field of Classification Search
CPC .......................... H04L 41/0609; H04L 41/065
See application file for complete search history.

(56) References Cited

U.S. PATENT DOCUMENTS

| | | | | |
|---|---|---|---|---|
| 6,674,713 B1 * | 1/2004 | Berg | .................. | H04M 7/1255 |
| | | | | 370/467 |
| 8,130,793 B2 * | 3/2012 | Edwards | ............... | H04M 15/00 |
| | | | | 455/406 |
| 8,229,705 B1 * | 7/2012 | Mizrahi | .................. | H04L 43/08 |
| | | | | 709/227 |
| 8,406,143 B2 * | 3/2013 | Long | ....................... | H04L 41/06 |
| | | | | 370/248 |
| 8,755,831 B2 * | 6/2014 | Brewer | ................. | H04W 72/56 |
| | | | | 455/518 |
| 8,804,492 B2 * | 8/2014 | Bertze | ................. | H04L 41/0631 |
| | | | | 370/242 |
| 9,264,328 B2 * | 2/2016 | Hu | ...................... | H04L 41/0886 |
| 9,485,161 B2 * | 11/2016 | Chhabra | ............. | H04L 43/0811 |
| 9,485,175 B2 * | 11/2016 | Abdul | ................. | H04L 41/0663 |
| 9,537,846 B2 * | 1/2017 | Jethanandani | .......... | H04L 63/08 |
| 9,743,447 B2 * | 8/2017 | Kim | ........................ | H04W 4/70 |
| 9,985,862 B2 * | 5/2018 | Hu | ...................... | H04L 43/0811 |
| 10,142,203 B2 * | 11/2018 | Jadav | .................. | H04L 41/0661 |
| 10,193,765 B2 * | 1/2019 | Holness | ................ | H04L 49/555 |

(Continued)

*Primary Examiner* — Abdelbasst Talioua

(74) *Attorney, Agent, or Firm* — Guntin & Gust, PLC; Kenneth S. Kwan

(57) ABSTRACT

Aspects of the subject disclosure may include, for example, obtaining data regarding a plurality of fault management services in a network, wherein the plurality of fault management services respectively correspond to a plurality of fault management sessions, and wherein the data identifies priority information for at least one fault management session of the plurality of fault management sessions, and performing one or more actions relating to the plurality of fault management sessions in accordance with the priority information. Other embodiments are disclosed.

19 Claims, 11 Drawing Sheets

(56) References Cited

U.S. PATENT DOCUMENTS

| | | | | |
|---|---|---|---|---|
| 10,333,770 B2 * | 6/2019 | Batra | H04L 43/0811 | |
| 10,476,763 B2 * | 11/2019 | Holness | H04L 43/0829 | |
| 10,541,889 B1 * | 1/2020 | Mishra | H04L 43/0876 | |
| 11,050,609 B2 * | 6/2021 | Vaderna | H04L 41/0622 | |
| 11,140,200 B1 * | 10/2021 | A | H04L 41/28 | |
| 11,212,163 B1 * | 12/2021 | A | H04L 43/0811 | |
| 11,336,549 B2 * | 5/2022 | Kannawadi | H04L 41/0886 | |
| 11,917,017 B1 * | 2/2024 | Priescu | H04L 47/62 | |
| 12,237,999 B1 * | 2/2025 | Hu | H04L 45/308 | |
| 2008/0074247 A1 * | 3/2008 | Plantamura | B60W 50/0205 | |
| | | | 340/691.3 | |
| 2009/0059799 A1 * | 3/2009 | Friskney | H04L 41/0681 | |
| | | | 370/241.1 | |
| 2009/0073988 A1 * | 3/2009 | Ghodrat | H04L 45/22 | |
| | | | 370/395.53 | |
| 2012/0076013 A1 * | 3/2012 | Cheng | H04L 43/55 | |
| | | | 370/252 | |
| 2012/0163194 A1 * | 6/2012 | Bertze | H04L 41/0631 | |
| | | | 370/242 | |
| 2013/0114394 A1 * | 5/2013 | Hu | H04L 41/0816 | |
| | | | 370/216 | |
| 2013/0163618 A1 * | 6/2013 | Sergeev | H04J 3/0667 | |
| | | | 370/503 | |
| 2014/0043999 A1 * | 2/2014 | Bugenhagen | H04L 43/0811 | |
| | | | 370/252 | |
| 2014/0092751 A1 * | 4/2014 | Meilik | H04L 41/0213 | |
| | | | 370/241.1 | |
| 2014/0192963 A1 * | 7/2014 | Connelly | H04M 3/20 | |
| | | | 379/37 | |
| 2015/0023179 A1 * | 1/2015 | Stein | H04L 43/0811 | |
| | | | 370/241.1 | |
| 2015/0058492 A1 * | 2/2015 | Meloche | H04L 69/40 | |
| | | | 709/228 | |
| 2015/0379788 A1 * | 12/2015 | Raynal | B60W 50/029 | |
| | | | 701/32.7 | |
| 2016/0014032 A1 * | 1/2016 | Ao | H04L 47/125 | |
| | | | 370/236 | |
| 2016/0020973 A1 * | 1/2016 | Mishra | H04L 43/0811 | |
| | | | 370/252 | |
| 2016/0036694 A1 * | 2/2016 | Abdul | H04L 41/0654 | |
| | | | 370/244 | |
| 2016/0198514 A1 * | 7/2016 | Wang | H04W 52/0238 | |
| | | | 370/311 | |
| 2018/0091445 A1 * | 3/2018 | Singh | H04L 45/66 | |
| 2018/0295031 A1 * | 10/2018 | Holness | H04L 47/125 | |
| 2018/0309615 A1 * | 10/2018 | Batra | H04L 43/062 | |
| 2019/0087789 A1 * | 3/2019 | Barkat | G06Q 10/06316 | |
| 2019/0155632 A1 * | 5/2019 | Toy | G06F 11/0793 | |
| 2019/0289506 A1 * | 9/2019 | Park | H04W 36/0044 | |
| 2020/0007422 A1 * | 1/2020 | Ramanarayanan | H04L 45/66 | |
| 2020/0019425 A1 * | 1/2020 | Toy | H04L 43/20 | |
| 2020/0021358 A1 * | 1/2020 | Maccaglia | H04L 43/16 | |
| 2020/0076726 A1 * | 3/2020 | Seth | H04L 41/0663 | |
| 2020/0204496 A1 * | 6/2020 | Cherukuru | H04L 69/28 | |
| 2020/0213182 A1 * | 7/2020 | Hugar | H04L 45/026 | |
| 2020/0337093 A1 * | 10/2020 | Kim | H04W 64/00 | |
| 2021/0160936 A1 * | 5/2021 | Yang | H04W 76/12 | |
| 2021/0250284 A1 * | 8/2021 | Aggarwal | H04L 12/2859 | |
| 2021/0344567 A1 * | 11/2021 | Li | H04L 12/1877 | |
| 2021/0359956 A1 * | 11/2021 | Abdulla | H04L 47/6295 | |
| 2022/0209858 A1 * | 6/2022 | Kay | H04W 36/22 | |
| 2023/0072593 A1 * | 3/2023 | Il | H04L 47/20 | |
| 2023/0090169 A1 * | 3/2023 | Mitcsenkov | H04L 43/08 | |
| | | | 455/423 | |
| 2023/0155880 A1 * | 5/2023 | Mustafa | H04L 41/0686 | |
| | | | 370/342 | |
| 2023/0224251 A1 * | 7/2023 | Su | H04L 47/2433 | |
| | | | 370/235 | |
| 2023/0231811 A1 * | 7/2023 | Dalal | G06F 13/1605 | |
| | | | 710/308 | |
| 2023/0275839 A1 * | 8/2023 | Nagase | H04L 47/24 | |
| 2024/0397418 A1 * | 11/2024 | Velev | H04W 48/18 | |
| 2025/0056302 A1 * | 2/2025 | Hamrick, Jr. | H04W 28/0268 | |

* cited by examiner

Figure 3:
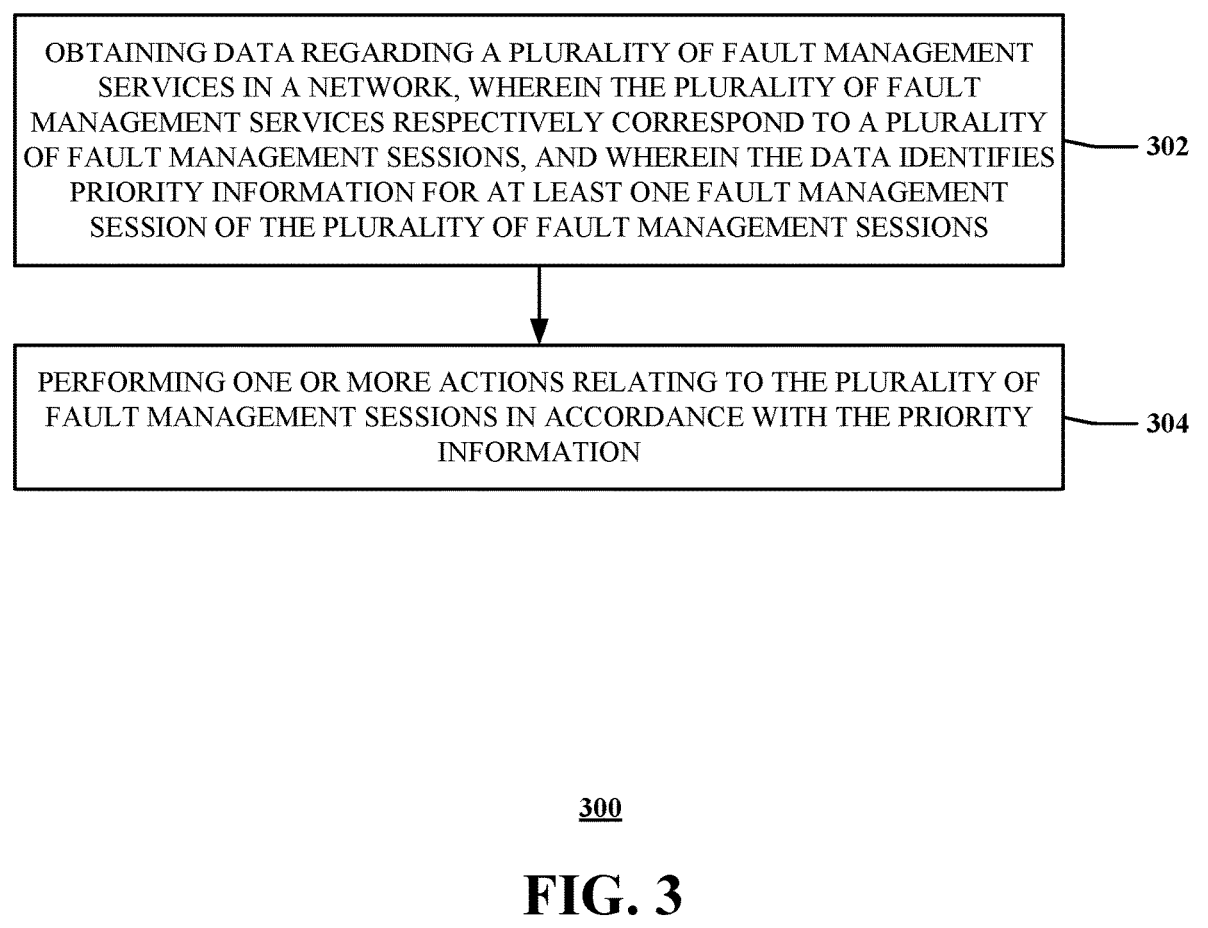

OBTAINING DATA REGARDING A PLURALITY OF FAULT MANAGEMENT SERVICES IN A NETWORK, WHEREIN THE PLURALITY OF FAULT MANAGEMENT SERVICES RESPECTIVELY CORRESPOND TO A PLURALITY OF FAULT MANAGEMENT SESSIONS, AND WHEREIN THE DATA IDENTIFIES PRIORITY INFORMATION FOR AT LEAST ONE FAULT MANAGEMENT SESSION OF THE PLURALITY OF FAULT MANAGEMENT SESSIONS — 302

PERFORMING ONE OR MORE ACTIONS RELATING TO THE PLURALITY OF FAULT MANAGEMENT SESSIONS IN ACCORDANCE WITH THE PRIORITY INFORMATION — 304

METHOD AND SYSTEM FOR PRIORITIZING FAULT MANAGEMENT SESSIONS, Y.1731 SESSIONS, AND/OR ASSOCIATED FAULT REPORTING

CROSS-REFERENCE TO RELATED APPLICATION

The present application claims priority to Indian Patent Application number 202311073873 filed on Oct. 30, 2023. All sections of the aforementioned application are incorporated herein by reference in their entirety.

FIELD OF THE DISCLOSURE

The subject disclosure relates to prioritizing fault management sessions and/or associated fault reporting.

BACKGROUND

The Institute of Electrical and Electronics Engineers (IEEE) 802.1ag standard and the International Telecommunication Union Telecommunication Standardization Sector (ITU-T) Y.1731 standard both define fault management within the context of Operations, Administration, and Maintenance (OAM). The IEEE 802.1ag standard defines Ethernet Connectivity Fault Management (CFM), which is an end-to-end, per-service-instance Ethernet layer OAM protocol that includes connectivity monitoring, fault verification, fault reporting, and fault isolation. The ITU-T Y.1731 standard augments IEEE 802.1ag with additional performance monitoring and fault management capabilities for Ethernet services.

CFM operates in the context of network domains—i.e., Maintenance Domains (MDs), which represent a broad administrative or operational domain within the network. An MD may encompass multiple Maintenance Associations (MAs), and defines network elements (e.g., switches, routers, network interfaces, etc.) that may share a common operating context and CFM configuration. An MA may be associated with a specific Ethernet service or service instance, and defines how individual services are monitored and maintained within the network. MAs may define forwarding domains (FDs) for CFM operations, which group network elements that share CFM packets relating to a given Ethernet service or connection. In a network system, there may be numerous FDs that are each associated with a flow point. An MA may encompass multiple Maintenance Endpoints (MEPs). MEPs are individual points within the network from which CFM packets are sent and at which CFM packets are received. More generally, an MEP is a specific point in an Ethernet network where OAM frames are generated/received. MEPs can constitute flow points of an FD. MEPs take part in the overall management of connectivity fault information and thus monitoring of the health of a particular service or connection. An MEP may be defined within the context of an MA, but is typically associated with the operational scope of the higher-level MD. MDs may also include Maintenance domain Intermediate Points (MIPs). A MIP is located between two MEPs, and thus are internal to the domain. MIPs may be configured to forward CFM packets as needed for maintenance purposes.

The IEEE 802.1ag and ITU-T Y.1731 standards define various protocols that help administrators monitor and assess faulty networks. For instance, IEEE 802.1ag defines the Continuity Check Protocol (CCP), the Link Trace (LT) protocol, the Loop-Back (LB) protocol, and other connectivity fault-related protocols involving CFM frames and messages that are supported by a CFM stack. A Continuity Check (CC) involves the detection of service cross-connect status (e.g., service ID mismatch), MEP configuration status (e.g., MEPID mismatch), missing or unexpected MEPs, and other conditions. CCP defines the messages—i.e., Continuity Check Messages (CCMs)—that may be transmitted for communicating CC information, including continuity fault information. CCMs enable components of an MD, such as MEP devices, MIP devices, etc., to detect, track, and report connectivity defects or failures in an MA. CCMs are unidirectional, confined within the respective MD, do not require receipt acknowledgement, and are typically sent in the form of multicast packets. ITU-T Y.1731 similarly defines protocols for CC, LT, and LB, but also provides for additional protocols relating to locked signals, test signals, frame loss measurements, frame delay measurements, and more.

BRIEF DESCRIPTION OF THE DRAWINGS

Reference will now be made to the accompanying drawings, which are not necessarily drawn to scale, and wherein:

FIG. 3 depicts an illustrative embodiment of a method in accordance with various aspects described herein.

DETAILED DESCRIPTION

Figure 1A:
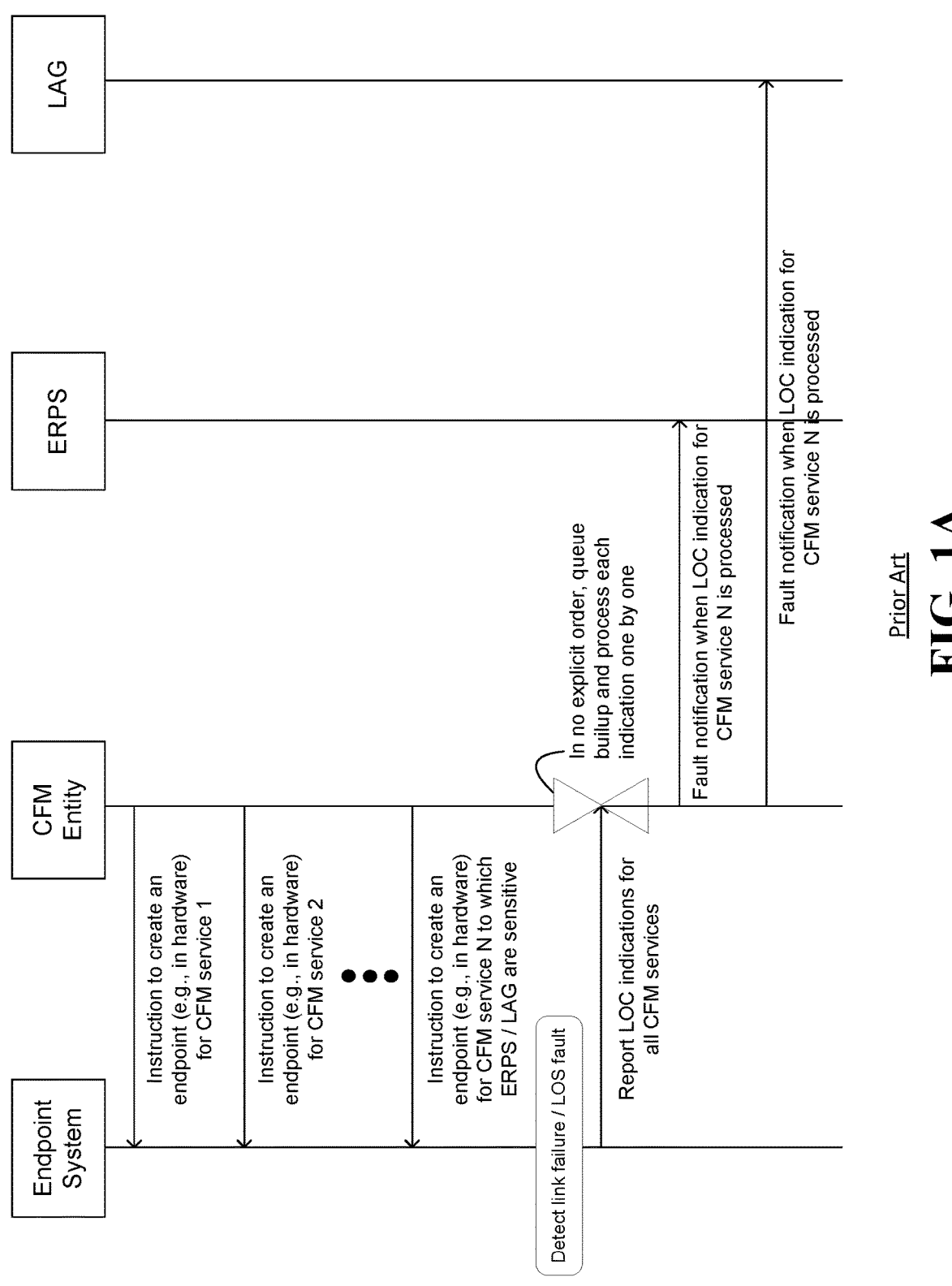
FIG. 1A is a flow diagram that illustrates a queue buildup of CFM faults without any explicit priority.

There are various issues or gaps with existing fault management standards and implementations. First consider a scenario in which there are numerous (e.g., 1,000) CFM sessions handled by a CFM entity in sequential fashion. FIG. 1A is a flow diagram that illustrates a queue buildup of CFM faults without any explicit priority. The CFM entity may be in communication with an endpoint system, an Ethernet Ring Protection Switching (ERPS) node, and a Link Aggregation (LAG) node. ERPS provides a recovery mechanism that enhances the reliability of Ethernet ring topologies by ensuring that data continues to flow despite the presence of network faults. LAG is a network technique that involves combining multiple physical network links into a single logical link. The endpoint system may include one or more application specific integrated circuits (ASICs) and/or software configurations that support fault detection, service continuity, and performance monitoring. For instance, the endpoint system may include physical aspects of an Open Systems Intercommunication (OSI) model Layer 2/3 switch, router, etc. As shown in FIG. 1A, the CFM entity may instruct the endpoint system to create multiple (e.g., accelerated) CFM services at similar intervals. For instance, the CFM entity may instruct the endpoint system to create an endpoint for a CFM service 1, an endpoint for a CFM service 2, and so on. An endpoint is a network address or location that can be used for communication or monitoring. Creation of an endpoint may involve the allocation of resources and/or configuration of hardware to monitor or manage a network segment or service. In the case of CCM, an endpoint may be a CCM generation and consumption point in the network. In any case, CFM service N may be a critical CFM service that relates to an Ethernet Ring Protection (ERP) instance and/or LAG for purposes of faster switchovers. In the event of a detected link failure or loss of service (LOS) fault, the endpoint system may transmit loss of connectivity (LOC) indications for all of the CFM services to the CFM entity for processing. The CFM entity may, in no explicit order, build up a queue for the LOC indications and process them one at a time. Because of the lack of prioritization for critical CFM services, such as CFM service N, the corresponding LOC indications may be positioned later in the queue and processing thereof may be significantly delayed. Delayed CFM fault notifications to ERPS/LAG can result in delayed switchovers and consequently high traffic drop rates.

Figure 1B:
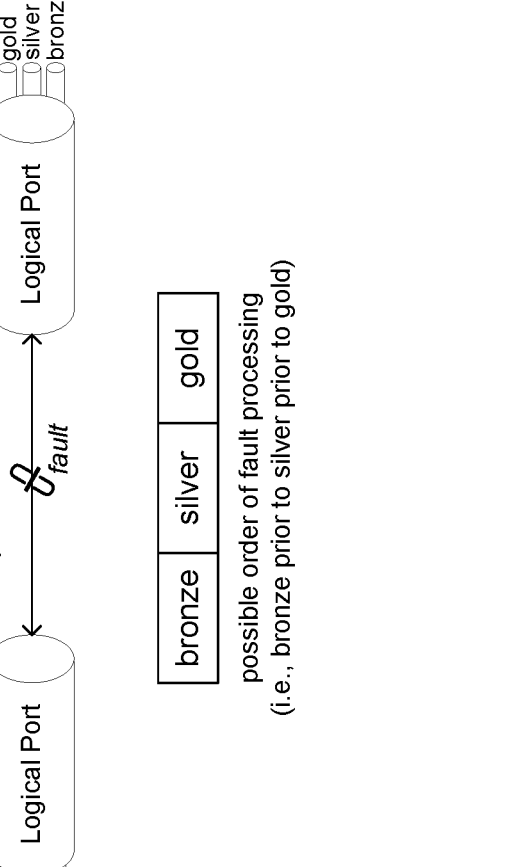
FIG. 1B illustrates a logical link that serves different classes of users.

FIG. 1B illustrates a logical link that serves different classes of users. In some scenarios, the different classes may be associated with different service level agreements (SLAs). For instance, a gold class user may have more stringent SLAs relative to those of a silver class user, the silver class user may have more stringent SLAs relative to those of a bronze class user, and so on. More stringent SLAs may warrant faster processing of service faults for the gold class user than for the silver class user, and faster processing of service faults for the silver class user than for the bronze class user. However, conventional CFM implementations lack mechanisms for prioritizing fault processing according to class. Thus, in a case where a single logical port is shared across different classes of users via different flow points, it is possible for bronze class fault processing to unduly occur prior to silver class fault processing and/or silver class fault processing to unduly occur prior to gold class fault processing.

Figure 1C:
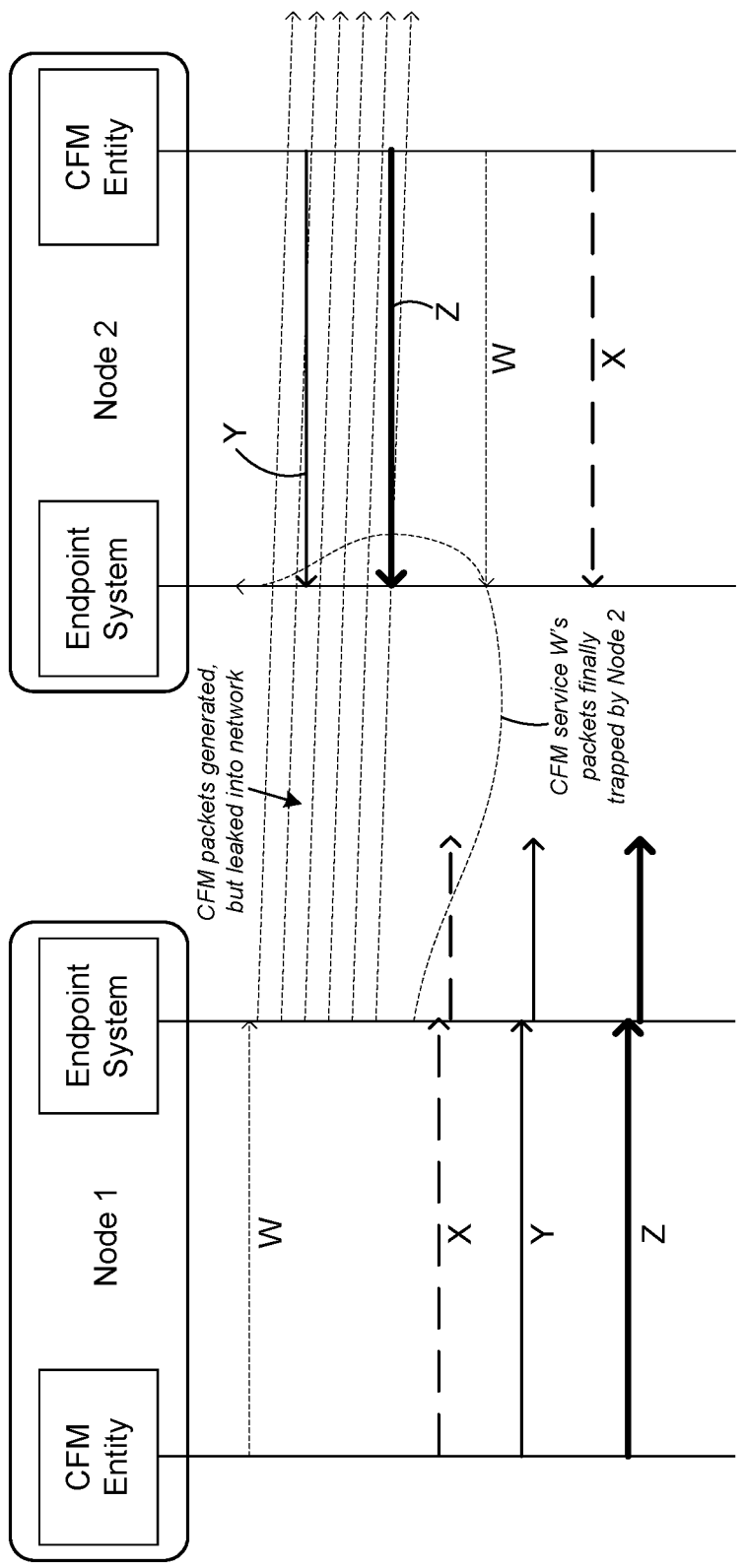
FIG. 1C illustrates an example of CFM packet leakage into a network.

Another issue with conventional CFM implementations is the possible leakage of (e.g., multicast) CFM packets due to out-of-order creation of CFM sessions between two devices. FIG. 1C illustrates an example of CFM packet leakage into a network. CFM services are generally preconfigured (e.g., by a user or administrator via a configuration file or the like) in a network management system, which instructs relevant nodes to create, configure, or initiate the various services. A system may support numerous CFM endpoints/services, each with a different set of parameters (e.g., MD levels, delta CCM intervals, etc.). Referring to FIG. 1C, a CFM entity in a node 1 may instruct a corresponding endpoint system to create respective endpoints for CFM services W, X, Y, Z, generate and multicast CFM packets therefor, and trap CFM packets received on an interface. Similarly, a CFM entity in a node 2 may instruct a corresponding endpoint system to create respective endpoints for CFM services W, X, Y, Z, generate and multicast CFM packets therefor, and trap CFM packets received on an interface. However, the endpoint systems of the nodes 1 and 2 may create the endpoints and/or generate and multicast packets for the CFM services in different orders due to the lack of CFM service/session prioritization. As shown in FIG. 1C, the endpoint systems of the nodes 1 and 2 may create the endpoints for CFM service W at different times—i.e., earlier at the node 1 and much later at the node 2. As a result, CFM packets generated and multicast by the endpoint at the node 1 for CFM service W may leak into the network. Such leakage may continue until the counterpart endpoint is finally created by the endpoint system of the node 2 for CFM service W and a handshake/CFM session is created between the two nodes 1 and 2 (i.e., CFM service configuration completion in both the nodes 1 and 2). Only after such session establishment for CFM service W will the endpoint system of the node 2 begin to trap the CFM packets transmitted from the node 1 for purposes of link failure/fault monitoring and reporting. Thus, prior to CFM packets being punted to the endpoint system of the node 2, leaked CFM packets can propagate through the length of the network, which can negatively impact network bandwidth and possibly even create security risks.

It is believed that there are no existing mechanisms for prioritizing fault management sessions. Indeed, neither the IEEE 802.1ag standard nor the ITU-T Y.1731 standard provides for prioritization of CFM/Y.1731 sessions. CCM fault handling and Y.1731 threshold event processing thus rest on how system databases and processing queues are designed for storing CFM session entries and processing events. Inability to rapidly and efficiently handle faults/events can negatively impact modules or systems that rely on fault management sessions for their operations, such as G.8032 (ERPS) nodes, LAG nodes, Programmable Policy Managers (PPMs), Intermediate System to Intermediate System (IS-IS)-based arrangements, etc. Also, when hardware resources are limited and shared, some accelerated CFM sessions may not be successfully programmed in an endpoint system. For instance, a less important CFM session may be successfully programmed in an endpoint system, whereas a more important one (e.g., relating to ERPS and/or LAG) may not. Remote Maintenance End Point (RMEP) objects can also be starved of resources. Additionally, unprioritized CFM configuration replay may add undesired delays in CFM session establishment, which may negatively impact OAM services. Further, container reboot/restart can also lead to delayed static RMEP replay. Moreover, unprioritized CFM sessions may also add undesired delays in Y.1731 session creation, event handling, etc., which may negatively impact Y.1731 dependent modules (e.g., IS-IS, Label Switched Paths (LSPs), and so on) that rely on fault management for their operations.

The subject disclosure describes illustrative embodiments of prioritizing fault management sessions and/or associated fault reporting. Fault management sessions may include CFM sessions and/or Y.1731 sessions. In exemplary embodiments, fault management session configuration (e.g., at the network element or node level) may include a (e.g., user or administrator) configurable priority knob or setting (e.g., a field or toggle) for setting session priority.

In various embodiments, defined priority levels can enable a fault management controller or entity (e.g., CFM stack or the like) to prioritize the initiation of creation of particular fault management sessions, which can be especially important after a node restart/reboot, after node commissioning or provisioning, and/or after session configuration in a "disabled state." From the perspective of end-to-end nodes—i.e., two MEPs, the nodes may prioritize initiation of creation of (or configuration for) the particular fault management sessions, which allows for faster associated handshakes/session establishment as compared to other fault management sessions.

In one or more embodiments, defined priority levels can additionally, or alternatively, enable the fault management controller or entity to prioritize fault handling for particular fault management sessions, such that associated alarms (e.g., CCM faults, Y.1731 events/results, etc.) may be processed with reduced handling times as compared to other fault management sessions.

Because a fault management service or session may relate not only to particular MEPs, but also to the higher-level MA and MD, prioritization of fault management services for session creation and/or prioritization of fault handling for various fault management sessions may be defined at the MD, MA, and/or MEP level. Thus, priority can be propagated to any object or hierarchical level that is subject to fault management.

Prioritization of fault management sessions for fault handling may be implemented in any suitable manner. For instance, prioritization may be implemented by creating and leveraging databases, queues, or threads. As an example, different databases, queues, or threads may each be associated with a respective priority level, where fault management sessions may be respectively assigned to the appropriate database, queue, or thread based on the priority levels of the sessions.

Enabling prioritization of fault management sessions, as described herein, provides a variety of technical benefits. First, prioritized creation of fault management sessions allows for faster fault management session establishment (between MEPs) for higher priority sessions, which addresses or minimizes the packet leakage issue discussed above. Additionally, prioritized handling of fault management sessions, particularly those relating to certain critical systems, such as ERPS, LAG, PPM, IS-IS, LSP, and so on that rely on CCM faults and/or Y.1731 events, generally improves the overall effectiveness of such systems. For instance, in a case where prioritization is implemented via databases, queues, or threads, the CFM stack can "jump" to the appropriate database, queue, or thread to process any detected faults. Handling faults in such a manner is beneficial especially in situations where numerous (e.g., 2,000, 4,000, 8,000, or even 16,000) fault management sessions or configurations are supported, since the critical link monitoring/management systems that have high sensitivity towards faults can quickly receive fault notifications. In some networks, hardware resources may be limited. Prioritization of fault management sessions can ensure that resources are available for more critical or more important sessions. As described in more detail below, CFM and/or Y.1731 sessions configuration replays can also be improved based on fault management session prioritizations.

In some contexts, multiple service providers may utilize the various network elements of a network to provide services to their customers or users. For instance, a first service provider may configure multiple VLANs (that all share the same port and/or node) for its end customers or users, a second service provider may configure multiple VLANs (on the same port and/or node) for its end customers or users, and so on. In these contexts, prioritization of fault management sessions can be defined by a network administrator for the different service providers (e.g., a higher priority class or level for one service provider with more stringent SLAs, a lower priority class or level for another service provider with less stringent SLAs, etc.). Additionally, or alternatively, a given service provider may define different priorities for different classes of its end customers or users (e.g., a higher priority class or level for one end user with more stringent SLAs, a lower priority class or level for another end user with less stringent SLAs, etc.). By enabling (e.g., explicit or implicit) prioritization of fault management sessions, the experience of different parties/entities that utilize the network can be flexibly managed or controlled.

Overall, session prioritization yields an improved and more reliable fault management session-based network.

Figure 2A:
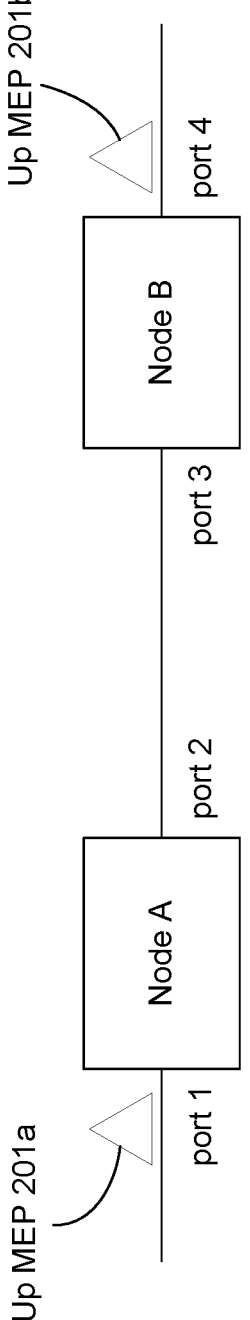
FIG. 2A is a block diagram illustrating an example, non-limiting embodiment of an MD, in accordance with various aspects described herein.

FIG. 2A is a block diagram illustrating an example, non-limiting embodiment of an MD 200, in accordance with various aspects described herein. In exemplary embodiments, continuity faults may be tracked and reported in the MD 200. The MD 200 may be configured to provide OAM functionality by means of various fault notifications (e.g., alarms, Simple Network Management Protocol (SNMP) traps, logs/event data (such as Syslog messages or the like), telemetry notifications, etc.). As shown in FIG. 2A, the MD 200 may include a node A and a node B, which may also be referred to as Network Elements (NEs). A node may be a device that includes hardware, software, or a combination thereof. For instance, a node may include one or more systems (e.g., ASICs and/or software configurations) that support fault detection, service continuity, and performance monitoring. Examples of nodes include switches, routers, bridges, hubs, security devices, or any other network equipment equipped to process Ethernet frames or packets and participate in CFM. Numerous MEPs may be configured in a single node depending on the capabilities of the node and the desired implementation. For example, a node may support 2,000 (2 k) MEPs or CFM sessions, 4,000 (4 k) MEPs or CFM sessions, 8,000 (8 k) MEPs or CFM sessions, 16,000 (16 k) MEPs or CFM sessions, and so on, thus enabling large-scale Ethernet networks, data centers, etc.

As shown in FIG. 2A, a port 1 of the node A may include an upstream (Up) MEP 201*a*, which can generate packets for transmission to other devices on the network. A port 4 of the node B may also include an Up MEP 201*b*, which can generate packets for transmission to other devices on the network. A port 2 of the node A may be coupled to a port 3 of the node B. A port represents a physical or logical/virtual (e.g., a virtual local area network (VLAN)) interface on a node where data flows in and out. Ports may be considered one type of flow point—i.e., locations where data flows can be observed, managed, or controlled. Although only two nodes, four ports, and two MEPs are shown in FIG. 2A, it is to be understood and appreciated that more nodes, more or fewer ports, and/or more MEPs may be included in the MD 200. In exemplary embodiments, one or more of the nodes A and B may facilitate prioritization of fault management sessions and/or associated fault reporting.

Figure 2B:
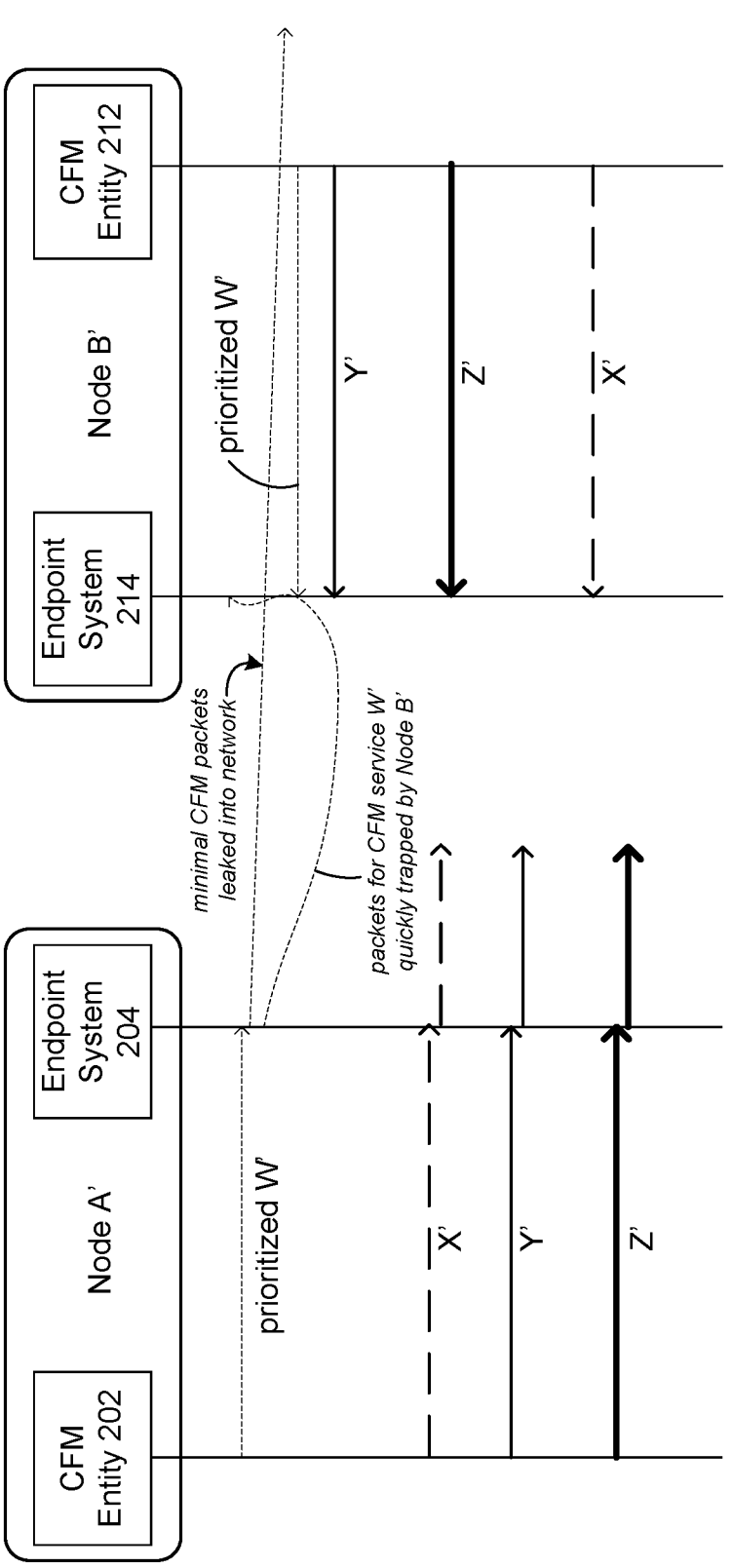
FIG. 2B illustrates an example of prioritized fault management session creation, in accordance with various aspects described herein.

FIG. 2B illustrates an example of prioritized fault management session creation, in accordance with various aspects described herein. In various embodiments, the nodes A' and B' may be respectively similar to or otherwise correspond to the nodes A and B of FIG. 2A. As shown in FIG. 2B, a CFM entity 202 in the node A' may instruct an endpoint system 204 to create respective endpoints for CFM services W', X', Y', Z', generate and multicast CFM packets therefor, and trap CFM packets received on an interface. Similarly, a CFM entity 212 in the node B' may instruct an endpoint system 214 to create respective endpoints for CFM services W', X', Y', Z', generate and multicast CFM packets therefor, and trap CFM packets received on an interface.

In exemplary embodiments, a configuration file for input to a network management system (not shown) may include a field or other user selectable or adjustable parameter for defining respective priority values or levels for one or more CFM services or CFM sessions thereof. The defined priority or priorities may propagate in CFM session configuration instructions that the network management system may transmit to the relevant nodes associated with the CFM services. This may cause the nodes, such as end-to-end nodes A' and B', to initiate creation of CFM sessions in a desired (e.g., the same) order according to the defined priority or priorities. For instance, in the example of FIG. 2B, CFM service W' may be associated with a higher priority than CFM services X', Y', Z' or may be selectively prioritized (where CFM services X', Y', Z' may not be selected for any prioritization). Here, nodes A' and node B' may prioritize the initiation of session creation for CFM service W' by configuring the session for CFM service W' prior to configuring the sessions for CFM services X', Y', Z'. For instance, the CFM entity 202 of the node A' may instruct the endpoint system 204 to create an endpoint for CFM service W' prior to instructing the endpoint system 204 to create endpoints for CFM services X', Y', Z', and the CFM entity 212 of the node B' may similarly instruct the endpoint system 214 to create an endpoint for CFM service W' prior to instructing the endpoint system 214 to create endpoints for CFM services X', Y', Z'. Implementing CFM service prioritization in this manner allows the order of initiation of session creation (at least for prioritized CFM service(s)) by end-to-end nodes to closely align (or be closely in sync), which allows for eventual session creation or establishment between the two nodes to occur much faster. This reduces the possibility of CFM packets being leaked into the network, thereby advantageously minimizing security threats and conserving overall network bandwidth.

It is to be understood and appreciated that, while the implementations in FIGS. 2A and 2B are described as relating to CFM sessions, similar implementations may be employed for Y.1731 sessions. Further, in some cases, Y.1731 sessions may run over CFM sessions. In these cases, Y.1731 sessions may be prioritized based on prioritized CFM sessions.

In various embodiments, prioritization of fault management services for session creation and/or prioritization of fault handling for various fault management sessions may be defined at the MD, MA, and/or MEP level. Consider a case where a user or administrator desires to assign a priority value or level to a MD. In this case, the MD and all of the corresponding MAs and MEPs may be prioritized accordingly. Consider a different case where a user or administrator desires to assign a priority value or level to an MA that is associated with a particular forwarding domain (FD). In this case, the MA (i.e., FD) and all of the corresponding MEPs may be prioritized accordingly.

The following are example configurations of priority at the MA level, which may be set in a configuration file or the like.

Example Setting of Priority Level:

```
config# maintenance-domain <md-instance> maintenance-association
<ma-instance>
priority <1 to 10>
```

Example Setting of Priority Based on Class:

```
config# maintenance-domain <md-instance> maintenance-association
<ma-instance>
priority
class-gold   class-silver   class-bronze
```

In an example implementation of priority assignment at the MD, MA, and/or MEP level(s), MDs, MAs, and MEPs may each have a default priority value of '0', but where an administrator or user may change the priority of a given MD, MA, and/or MEP to a value other than '0' (e.g., any value from 1 to 10). A sum of these priority values may be derived (e.g., by a network management system), where a higher sum value indicates a higher priority. As an example, in a case where an administrator or user defines priority as shown below, the network management system may propagate appropriate priority instructions to one or more nodes such that services associated with MD2, MA2, and MEP2 are prioritized as compared to services associated with MD1, MA1, and MEP1:

```
MD1 priority = '3'
MA1 priority = '3'
MEP1 priority = '0' (default)
    Sum = 6
MD2 priority = '3'
MA2 priority = '3'
MEP2 priority = '1'
    Sum = 7
```

Figure 2C:
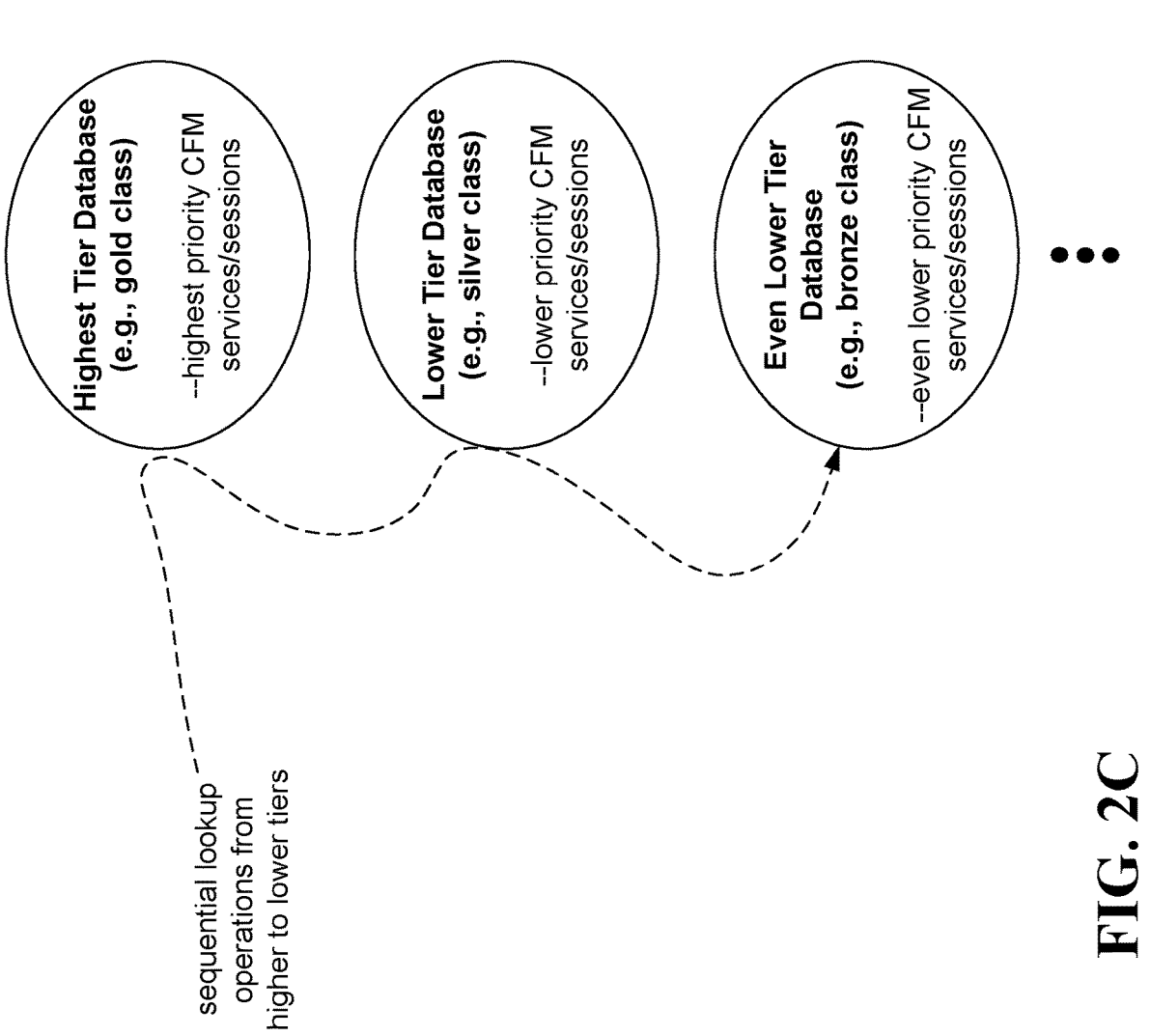
FIG. 2C illustrates how fault management session prioritization by way of tiered databases can be implemented for CFM, in accordance with various aspects described herein.

Prioritization of fault management sessions for fault handling may be implemented in any suitable manner. In one or more embodiments, fault handling prioritization may be implemented via databases. In this implementation, the databases may be segregated into tiers—e.g., gold class database, silver class database, bronze class database, etc.—where a higher priority CFM session (such as that which ERPS, LAG, PPM, or the like may rely upon) may be associated with a higher tier database. FIG. 2C illustrates how fault management session prioritization by way of tiered databases can be implemented for CFM, in accordance with various aspects described herein. In exemplary embodiments, a unique identifier may be associated with fault messages/events for a given CFM session, and may be stored in a particular database depending on a defined priority for the CFM session. For instance, a higher priority CFM session may be assigned to a gold class database, a lower priority CFM session may be assigned to a silver class database, an even lower priority CFM session may be assigned to a bronze class database, and so on. In various embodiments, a CFM session lookup order by a CFM stack or entity may be aligned with the different database tiers, such that processing of a detected fault for the CFM session involves lookup operations across the databases in sequential fashion—i.e., lookup of the CFM session first in the highest tier database, then in a lower tier database if not found in the highest tier database, then in an even lower tier database if still not found, and so on. By virtue of this sequential lookup across the tiers of databases, a higher priority CFM session that corresponds to a detected fault message/event may be identified more quickly over a lower priority CFM session, thereby enabling faster handling of faults/events for higher priority CFM sessions. This is especially beneficial in cases where a single port fault may involve many LOC events or the like for a variety of CFM sessions. Processing the faults in an otherwise random order can unduly delay fault handling for more important CFM sessions, such as those that ERPS, LAG, PPM, or the like may rely upon.

Figure 2D:
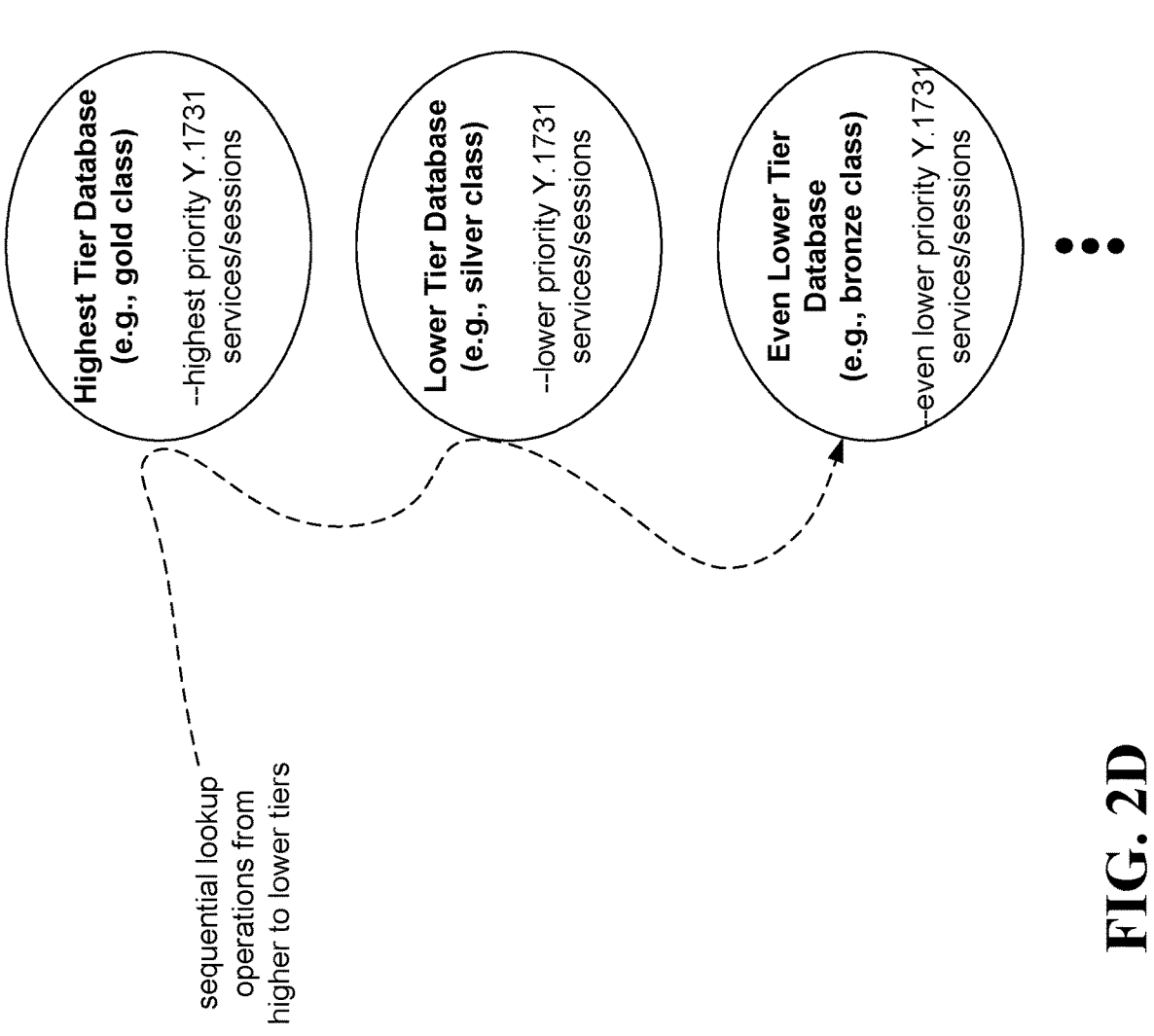
FIG. 2D illustrates how fault management session prioritization by way of tiered databases can be implemented for Y.1731, in accordance with various aspects described herein.

It will be understood and appreciated that prioritization based on tiered databases can be similarly implemented for Y.1731 sessions. FIG. 2D illustrates how fault management session prioritization by way of tiered databases can be implemented for Y.1731, in accordance with various aspects described herein. Again, in some cases, Y.1731 sessions may run over CFM sessions. In these cases, Y.1731 sessions may be prioritized via tiered databases based on the tiered database-based prioritization of the underlying CFM sessions.

Figure 2E:
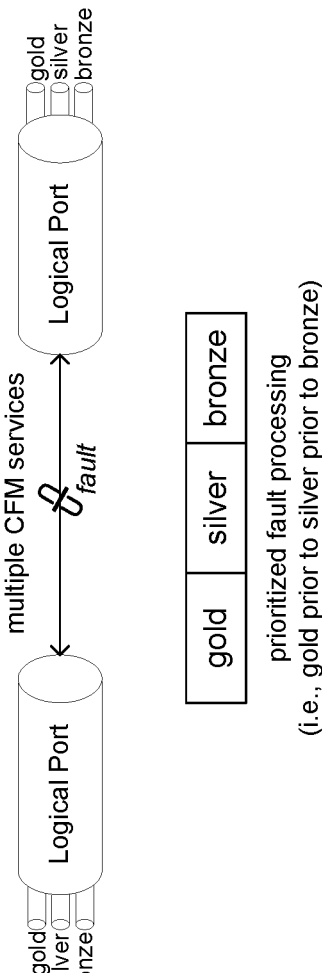
FIG. 2E illustrates a logical link that serves different classes of users based on defined priorities, in accordance with various aspects described herein.

FIG. 2E illustrates a logical link that serves different classes of users based on defined priorities, in accordance with various aspects described herein. As shown in FIG. 2E, CFM session priority ensures faster handling of higher-class customer services. In one or more embodiments, fault handling prioritization may alternatively be implemented by way of queues. For instance, at a CFM entity (e.g., CFM entity 202 or 212), a single thread may be employed to process all faults detected and reported by an endpoint system (e.g., endpoint system 204 or 214). A thread is a virtual component that helps a processor handle multiple tasks more efficiently. In a case of a port failure, all endpoint systems running on that port may report (e.g., LOC) faults. Of course, a hardware-based endpoint system may detect and reports faults more quickly than a software-based CFM entity can process. To facilitate prioritized handling of the possibly numerous reported faults, multiple queues of faults may be implemented for the processing thread to cycle through for processing. As an example, the CFM entity may create and manage a first queue associated with CFM session(s) of a particular priority or range of priorities, a second queue associated with CFM session(s) of a different (e.g., lower) priority or a different range of (e.g., lower) priorities, and so on, where processing of faults by the processing thread is in a sequential or prioritized fashion—i.e., first the faults in the first queue, then the faults in the second queue, etc. Continuing the example, the CFM entity may assign reported faults to the different queues according to the priorities of CFM sessions corresponding to those faults. In some embodiments, the CFM entity may assign a respective weight to each queue, and perform weighted round robin processing for the queues to ensure that no particular queue is "starved" for longer than a threshold duration.

In some cases, Y.1731 sessions may run over CFM sessions. In these cases, Y.1731 sessions may be prioritized by way of queues based on the queues-based prioritization of the underlying CFM sessions. Overall, processing of faults according to queues enables faster fault handling for prioritized CFM sessions, which can improve switchover times for modules/systems, such as ERPS, LAG, PPM, etc. Similarly, processing of faults according to queues enables faster fault handling for prioritized Y.1731 sessions, which can improve switchover times for modules/systems, such as IS-IS, LSP, etc.

Figure 2F:
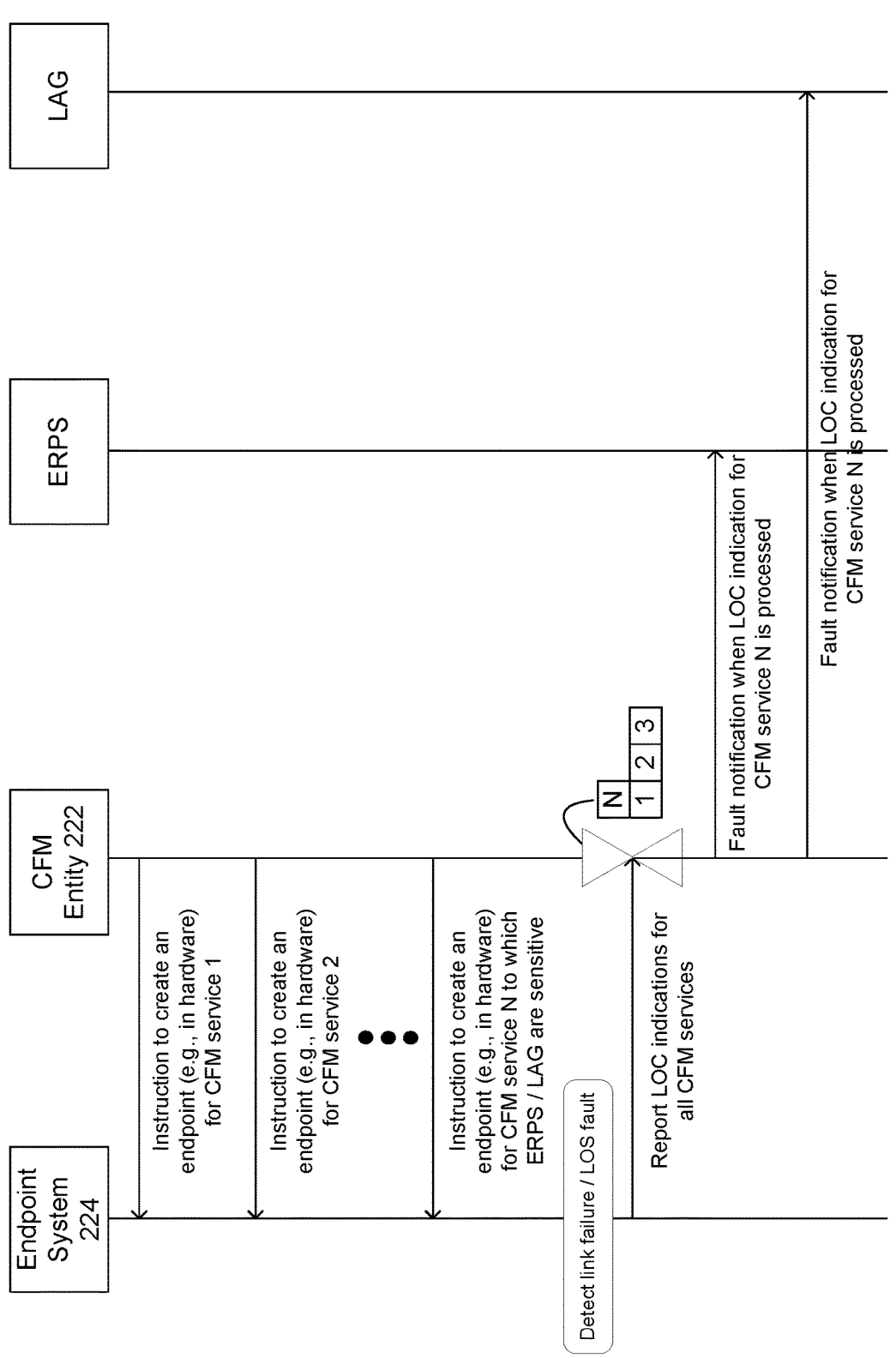
FIG. 2F is a flow diagram that illustrates an implementation of multiple queues of CFM faults according to priority, in accordance with various aspects described herein.

FIG. 2F is a flow diagram that illustrates an implementation of multiple queues of CFM faults according to priority, in accordance with various aspects described herein. Similar to the flow described above with respect to FIG. 1A, a CFM entity 222 in FIG. 2F may be in communication with an endpoint system 224, an ERPS node, and a LAG node. As shown in FIG. 2F, a separate, higher priority queue may be created for CFM service N versus the queue for CFM services 1, 2, and 3. The implementation of multiple queues in this manner ensures much faster handling of faults (e.g., for CFM sessions that ERPS/LAG rely upon) than possible in the system of FIG. 1A.

In one or more embodiments, fault handling prioritization may alternatively be implemented by way of different threads. For instance, rather than using a single thread at a CFM entity to process all faults detected and reported by an endpoint system, the CFM entity may facilitate prioritized fault handling by creating or employing multiple threads. As an example, the CFM entity may create or employ a first thread associated with CFM session(s) of a particular priority or range of priorities, a second thread associated with CFM session(s) of a different (e.g., lower) priority or a different range of (e.g., lower) priorities, and so on, where the first thread may have a higher priority for feeding tasks to the processor, the second thread may have a lower priority for feeding tasks to the processor, etc. In various embodiments, each created endpoint, and thus corresponding CFM session, may be associated with a unique identifier, where a detected fault therefor may be assigned to a particular thread depending on the priority of the CFM session. In some embodiments, different threads may be respectively associated with different queues of different priorities, where a hardware abstraction layer (HAL) may be configured to place detected faults/events into the appropriate queues based upon pre-programmed attributes for processing by the appropriate threads. In any case, the various threads may facilitate fault processing at different prioritizations. In one or more embodiments, an advanced scheduling mechanism may be provided to manage the threads/queues so as to avoid starving any of them.

It will be understood and appreciated that prioritization of CFM services/sessions may depend on context, such as the need to accommodate the fault sensitivity of critical systems or to tend to SLAs for certain users or classes. For instance, in most scenarios, not all endpoint or CFM services/sessions may be assigned or associated with a priority value or level. That is, only certain endpoint(s) or CFM service(s)/session(s) may be prioritized, where the remaining (i.e., the vast majority of) endpoints or CFM services/sessions may not be assigned or associated with any priority value or level, and thus session creation and/or fault processing for this remainder set may be done randomly or in no particular order amongst themselves.

In exemplary embodiments, priority in the above-described database-related implementation(s), queue-related implementation(s), and/or thread-related implementations(s) may be inherited internally based on the priorities given or defined at the time of CFM session (e.g., CCM/Y.1731) creation. Again, as an example, a network administrator may input these priorities in a configuration file that specifies how CFM sessions (e.g., CCM/Y.1731) are to be created/managed.

As can be seen by one skilled in the art, exemplary embodiments of prioritized fault management session creation and/or associated fault handling provide numerous benefits, including faster monitoring of and reporting for critical services and links. Prioritizing CFM sessions ensures that hardware resources are available for important CFM sessions. This is especially crucial in the case of RMEP discovery. Indeed, prioritizing CFM sessions, as described herein enables faster static RMEP creation. Further, Y.1731 sessions that run over prioritized CFM sessions may be provisioned more quickly, and events/processing results of Y.1731 sessions may be prioritized based on the parent or underlying CFM session, which allows for faster notification or events delivery to "listening" modules, such as IS-IS, LSP, signal degrade, etc.

Configuration replays may be triggered by microservice/container restarts, node restarts, or the like, and may involve re-creation of fault management sessions according to a prior (or original) order of creation. It will be understood and appreciated that prioritized and "in sync" (or near "in-sync") creation of CFM sessions can also facilitate "in sync" (or near "in-sync") configuration replays, enabling faster CFM session re-creation in software and hardware and minimizing the leakage of CFM packets in the network, which are especially beneficial in scaled configurations. For instance, prioritized CFM configuration replay ensures that the hardware resources are available for prioritized CFM sessions, especially in the case of RMEP discovery, where objects such as RMEP depend upon run time and are not released immediately.

It is to be understood and appreciated that, although one or more of FIGS. 2A, 2B, and 2F might be described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein. Furthermore, while various nodes, entities, systems, etc. may have been illustrated in one or more of FIGS. 2A, 2B, and 2F as separate nodes, entities, systems, etc., it will be appreciated that multiple nodes, entities, systems, etc. can be implemented as a single node, entity, system, etc., or a single node, entity, system, etc. can be implemented as multiple nodes, entities, systems, etc. Additionally, functions described as being performed by one node, entity, system, etc. may be performed by multiple nodes, entities, systems, etc., or functions described as being performed by multiple nodes, entities, systems, etc. may be performed by a single node, entity, system, etc.

FIG. 3 depicts an illustrative embodiment of a method 300 in accordance with various aspects described herein.

At 302, the method can include obtaining data regarding a plurality of fault management services in a network, wherein the plurality of fault management services respectively correspond to a plurality of fault management sessions, and wherein the data identifies priority information for at least one fault management session of the plurality of fault management sessions. For example, a CFM entity may, similar to that described elsewhere herein, perform one or more operations that include obtaining data regarding a plurality of fault management services in a network, wherein the plurality of fault management services respectively correspond to a plurality of fault management sessions, and wherein the data identifies priority information for at least one fault management session of the plurality of fault management sessions.

At 304, the method can include performing one or more actions relating to the plurality of fault management sessions in accordance with the priority information. For example, the CFM entity may, similar to that described elsewhere herein, perform one or more operations that include performing one or more actions relating to the plurality of fault management sessions in accordance with the priority information.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

One or more aspects of the subject disclosure include an apparatus that comprises a processing system including a processor, and a memory that stores executable instructions that, when executed by the processing system, facilitate performance of operations. The operations may include obtaining data regarding a plurality of fault management services in a network, wherein the plurality of fault management services respectively correspond to a plurality of fault management sessions, and wherein the data identifies priority information for at least one fault management session of the plurality of fault management sessions. The operations may further include performing one or more actions relating to the plurality of fault management sessions in accordance with the priority information.

One or more aspects of the subject disclosure include a non-transitory machine-readable medium, comprising executable instructions that, when executed by a processing system including a processor, facilitate performance of operations. The operations may include obtaining data regarding a plurality of fault management services in a network, wherein the plurality of fault management services respectively correspond to a plurality of fault management sessions, and wherein the data identifies priority information for at least one fault management session of the plurality of fault management sessions. The operations may further include performing one or more actions relating to the plurality of fault management sessions in accordance with the priority information.

One or more aspects of the subject disclosure include a method. The method may include obtaining, by a processing system including a processor, data regarding a plurality of fault management services in a network, wherein the plurality of fault management services respectively correspond to a plurality of fault management sessions, and wherein the data identifies priority information for at least one fault management session of the plurality of fault management sessions. The method may further include performing, by the processing system, one or more actions relating to the plurality of fault management sessions in accordance with the priority information.

Figure 4:
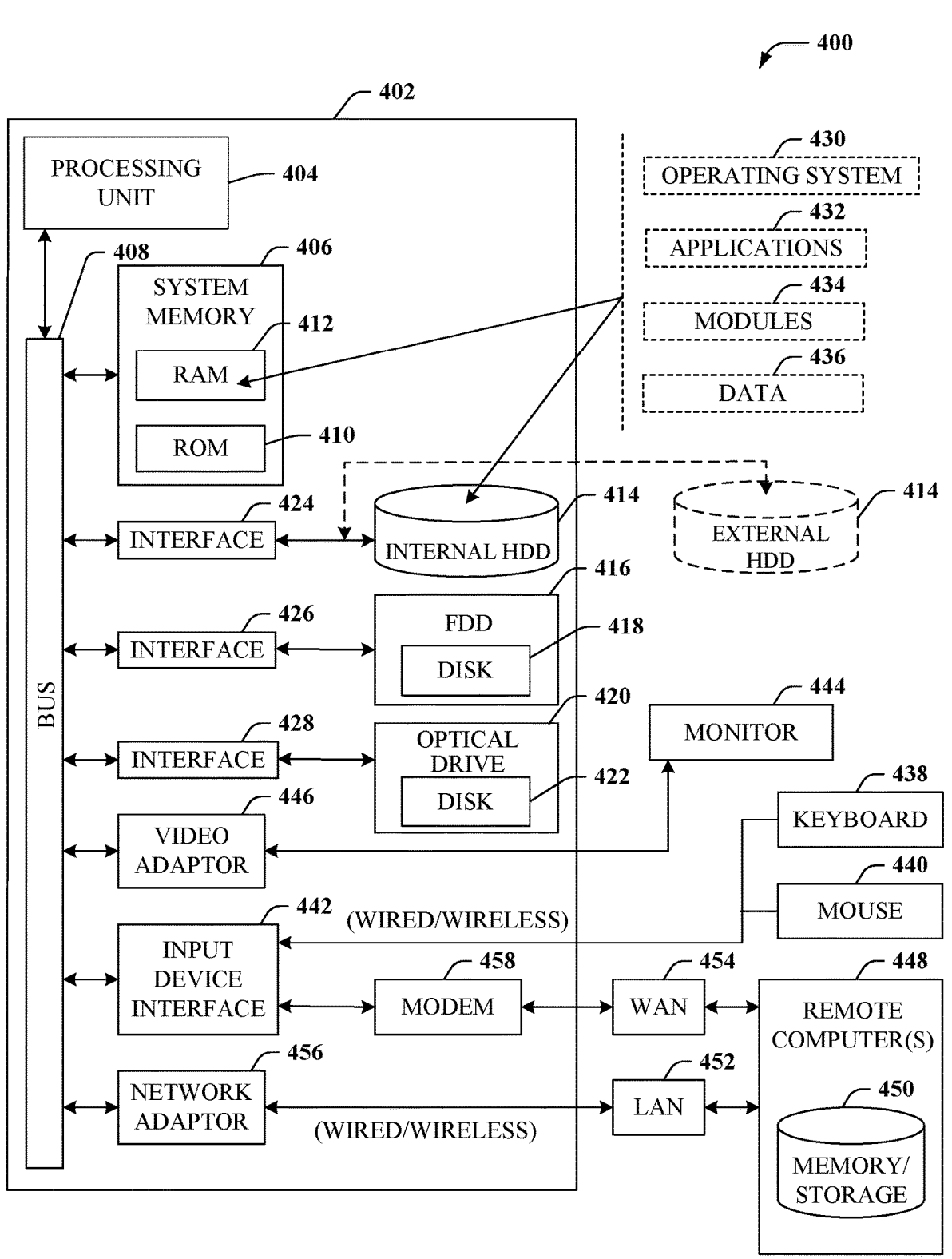
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. For example, computing environment 400 can facilitate, in whole or in part, prioritization of fault management sessions and/or associated fault reporting.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can comprise the widest variety of storage media including tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. An apparatus, comprising:

a processing system including a processor; and a memory that stores executable instructions that, when executed by the processing system, facilitate performance of operations, the operations comprising:

obtaining data regarding a plurality of fault management services in a network, wherein the plurality of fault management services respectively correspond to a plurality of fault management sessions, wherein the plurality of fault management services are a plurality of Connectivity Fault Management (CFM) services and the plurality of fault management sessions are a plurality of CFM sessions, or wherein the plurality of fault management services are Y.1731 services and the plurality of fault management sessions are a plurality of Y.1731 sessions, wherein the data identifies priority information for at least one fault management session of the plurality of fault management sessions, and wherein the priority information is defined for a maintenance endpoint (MEP), and based on the priority information, creating the MEP for the at least one fault management session prior to creating other maintenance endpoints (MEPs) for other fault management sessions of the plurality of fault management sessions, wherein creating the MEP prior to creating the other MEPs results in both of: reducing a risk of delay in fault notifications associated with the at least one fault management session; and reducing a risk of leakage of fault management packets through the network.

2. The apparatus of claim 1, wherein the data is also obtained by a second apparatus, and wherein the second apparatus also, based on the priority information, creates another endpoint for the at least one fault management session prior to creating other endpoints for the other fault management sessions, thereby resulting in prioritized creation of the at least one fault management session between the apparatus and the second apparatus.

3. The apparatus of claim 1, wherein the priority information comprises a first priority for the at least one fault management session, and a second lower priority for at least another fault management session of the plurality of fault management sessions, wherein initiation of creation of the at least one fault management session is prioritized over initiation of creation of the at least another fault management session, and wherein the initiation of creation of the at least another fault management session is prioritized over initiation of creation of other fault management sessions.

4. The apparatus of claim 1, wherein the operations further comprise receiving, from an endpoint system, a plurality of fault messages that respectively correspond to the plurality of fault management sessions, and causing the plurality of fault messages to be processed such that fault handling for the at least one fault management session is prioritized over the other fault management sessions.

5. The apparatus of claim 4, wherein the causing is implemented via one or more prioritized queues, one or more prioritized threads, one or more prioritized databases, or a combination thereof.

6. The apparatus of claim 4, wherein the endpoint system comprises an application specific integrated circuit (ASIC).

7. The apparatus of claim 1, wherein the priority information comprises a first priority for the at least one fault management session, and a second lower priority for at least another fault management session of the plurality of fault management sessions, wherein fault handling for the at least one fault management session is prioritized over fault handling for the at least another fault management session, and wherein the fault handling for the at least another fault management session is prioritized over fault handling for other fault management sessions.

8. The apparatus of claim 1, wherein fault messages associated with the at least one fault management session are relied upon by one or more systems relating to Ethernet Ring Protection Switching (ERPS), Link Aggregation Group (LAG), Programmable Policy Management (PPM), Intermediate System to Intermediate System (IS-IS), or a combination thereof.

9. The apparatus of claim 1, wherein the priority information is user-defined.

10. The apparatus of claim 1, wherein the data is obtained from a network management system that manages the apparatus and one or more other apparatuses in the network.

11. The apparatus of claim 1, wherein the priority information is defined based on one or more service providers or users that are associated with a higher class of service, a more stringent service level agreement (SLA), or a combination thereof.

12. A non-transitory machine-readable medium, comprising executable instructions that, when executed by a processing system including a processor, facilitate performance of operations, the operations comprising:

obtaining data regarding a plurality of fault management services in a network, wherein the plurality of fault management services respectively correspond to a plurality of fault management sessions, wherein the plurality of fault management services are a plurality of Connectivity Fault Management (CFM) services and the plurality of fault management sessions are a plurality of CFM sessions, or wherein the plurality of fault management services are Y.1731 services and the plurality of fault management sessions are a plurality of Y.1731 sessions, wherein the data identifies priority information for at least one fault management session of the plurality of fault management sessions, and wherein the priority information is defined for a maintenance endpoint (MEP); and based on the priority information, creating the MEP for the at least one fault management session prior to creating other maintenance endpoints (MEPs) for other fault management sessions of the plurality of fault management sessions, wherein creating the MEP prior to creating the other MEPs results in both of: reducing a risk of delay in fault notifications associated with the at least one fault management session; and reducing a risk of leakage of fault management packets through the network.

13. The non-transitory machine-readable medium of claim 12, wherein the operations further comprise:

receiving, from an endpoint system, a plurality of fault messages that respectively correspond to the plurality of fault management sessions, and causing the plurality of fault messages to be processed such that fault handling for the at least one fault management session is prioritized over the other fault management sessions.

14. The non-transitory machine-readable medium of claim 12, wherein the priority information is user-defined.

15. A method, comprising:

obtaining, by a processing system including a processor, data regarding a plurality of fault management services in a network, wherein the plurality of fault management services respectively correspond to a plurality of fault management sessions, wherein the plurality of fault management services are a plurality of Connectivity Fault Management (CFM) services and the plurality of fault management sessions are a plurality of CFM sessions, or wherein the plurality of fault management services are Y.1731 services and the plurality of fault management sessions are a plurality of Y.1731 sessions, wherein the data identifies priority information for at least one fault management session of the plurality of fault management sessions, and wherein the priority information is defined for a maintenance endpoint (MEP); and based on the priority information, creating, by the processing system, the MEP for the at least one fault management session prior to creating other maintenance endpoints (MEPs) for other fault management sessions of the plurality of fault management sessions, wherein creating the MEP prior to creating the other MEPs results in both of: reducing a risk of delay in fault notifications associated with the at least one fault management session; and reducing a risk of leakage of fault management packets through the network.

16. The method of claim 15, further comprising:

receiving, by the processing system, a plurality of fault messages that respectively correspond to the plurality of fault management sessions; and causing, by the processing system, the plurality of fault messages to be processed such that fault handling for the at least one fault management session is prioritized over the other fault management sessions.

17. The method of claim 16, wherein the causing is implemented via one or more prioritized queues, one or more prioritized threads, one or more prioritized databases, or a combination thereof.

18. The method of claim 15, wherein the priority information is user-defined.

19. The method of claim 15, wherein the priority information is defined based on one or more service providers or users that are associated with a higher class of service, a more stringent service level agreement (SLA), or a combination thereof.

* * * * *